United States Patent
Stallman (10) Patent No.: US 9,767,209 B2
(45) Date of Patent: Sep. 19, 2017

(54) SEARCH FILTERING BASED ON EXPECTED FUTURE TIME AND LOCATION

(75) Inventor: Michael Stallman, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 707 days.

(21) Appl. No.: 12/473,765

(22) Filed: May 28, 2009

(65) Prior Publication Data

US 2010/0305848 A1    Dec. 2, 2010

(51) Int. Cl.
*G06F 17/30* (2006.01)
*G01C 21/36* (2006.01)

(52) U.S. Cl.
CPC ..... *G06F 17/3087* (2013.01); *G01C 21/3682* (2013.01)

(58) Field of Classification Search
CPC .......... G01C 21/3682; G06F 17/3087
USPC ............. 701/208; 340/539.11, 539.13, 309.7
See application file for complete search history.

(56) References Cited

U.S. PATENT DOCUMENTS

| | | | |
|---|---|---|---|
| 6,374,180 B1 | 4/2002 | Slominski et al. | |
| 6,401,034 B1 | 6/2002 | Kaplan et al. | |
| 6,484,088 B1* | 11/2002 | Reimer | 701/123 |
| 6,636,801 B2 | 10/2003 | Curbow | |
| 6,895,329 B1* | 5/2005 | Wolfson | G01C 21/3415 340/988 |
| 7,155,339 B2 | 12/2006 | Tu | |
| 7,486,201 B2* | 2/2009 | Kelly et al. | 340/905 |
| 7,743,056 B2* | 6/2010 | Meisels | G06F 17/30241 707/731 |
| 8,458,177 B2* | 6/2013 | Athsani | G06F 17/30867 707/732 |
| 2002/0171673 A1* | 11/2002 | Brown et al. | 345/700 |
| 2007/0006098 A1 | 1/2007 | Krumm et al. | |
| 2007/0010942 A1* | 1/2007 | Bill | G01C 21/3679 701/424 |
| 2008/0249983 A1* | 10/2008 | Meisels | G06F 17/30241 |
| 2009/0012953 A1* | 1/2009 | Chu et al. | 707/5 |
| 2009/0157289 A1* | 6/2009 | Graessley | B60L 3/12 701/123 |
| 2010/0121803 A1* | 5/2010 | Gill | 706/46 |
| 2010/0122208 A1* | 5/2010 | Herr | G06F 3/04845 715/799 |
| 2010/0168994 A1* | 7/2010 | Bourque | G01C 21/3617 701/532 |
| 2010/0217482 A1* | 8/2010 | Vogel et al. | 701/36 |
| 2010/0228473 A1* | 9/2010 | Ranford | 701/204 |

* cited by examiner

*Primary Examiner* — F. Zeender
*Assistant Examiner* — Milena Racic
(74) *Attorney, Agent, or Firm* — Kilpatrick Townsend & Stockton LLP (57) ABSTRACT

Systems and methods are provided for identifying points of interest and specific locations located in the vicinity of an expected future location of a user. When a user provides a search request for a point of interest that will be of interest only at a future time, the electronic device can automatically predict an expected future location of the user, and provide points of interest near the expected future location.

27 Claims, 5 Drawing Sheets

SEARCH FILTERING BASED ON EXPECTED FUTURE TIME AND LOCATION

BACKGROUND OF THE INVENTION

This is directed to systems and methods for filtering search results for points of interest in a mapping application based on an expected future position of a user at a particular future time.

Users of electronic devices, and in particular electronic devices having positioning circuitry, can direct the devices to search for points of interest in the vicinity of the user, or along a specified route of the user. For example, a user can provide one or more search terms identifying a particular point of interest, and direct the electronic device to identify the points of interest or other locations in the vicinity of the current location of the device. As another example, a user can provide a destination to the device and direct the device to identify a preferred path for reaching the destination. In response to a user directing the electronic device to search for points of interest or other locations associated with one or more search terms, the electronic device can identify points of interest along the preferred path. The points of interest can be selected based on their proximity (e.g., as a straight line distance, driving distance, travel time, or other measure of distance) to the preferred path.

The electronic device can order the points of interest related to search terms using any suitable approach. In some embodiments, the electronic device can order the points of interest based on distance to a current location, added time to a route, alphabetically, or based on any other suitable criteria. The identified points of interest, however, are typically identified based on either a current location or any location along the route. In addition, the points of interest displayed to the user are selected based on the moment in time at which the search is requested.

SUMMARY OF THE INVENTION

This is directed to systems and methods for searching for points of interest and specific locations located in the vicinity of where a user is expected to be at a future time, and that will be of interest to the user at the future time. In particular, this is directed to identifying expected future needs or interests of a user, and providing points of interests or locations matching the identified expected future needs or interests that are near the user's expected future location.

In some embodiments, an electronic device can include positioning circuitry combined with a mapping application to provide location-specific information to a user. For example, the electronic device can provide directions for reaching a destination from a starting location. As another example, the electronic device can provide points of interests or other locations of interest to a user. The points of interests or other locations can be displayed to the user using any suitable approach, including for example based on the distance of the points of interest from a particular location (e.g., from the current position of the device), based on the type of point of interest, the relevance of the points of interest (e.g., relative to a search term), or any other suitable approach.

In some embodiments, the electronic device can order the points of interest based on the user's current position and expected future position. For example, the electronic device can determine a user's expected route, and provide points of interest that are ahead of the user and along the route while substantially ignoring points of interest behind the user's current position along the route. As another example, the electronic device can determine, from a magnometer or other appropriate sensor, the orientation in which the device is facing, and provide results for points of interest in the facing orientation. The identified points of interest resulting from the search, however, may be found near the current location or along the predetermined path. The points of interest, therefore, are time independent in the sense that the search results are selected only based on the path or location of the device.

In some cases, a user may wish to identify points of interest for a future moment in time. For example, the user may wish to identify restaurants or other food sources at a meal time. As another example, the user may wish to identify gas stations for the future time when the user will need gas in a vehicle. Because the user may be traveling along a path, it may be of little or no use to provide the user with points of interest near the current position of the user when the points of interest will only be relevant at a future time. Accordingly, the electronic device can predict the user's future position at the future time, and provide time dependent points of interest that are in the vicinity of the user's expected position at the future time.

In response to receiving a search term, the electronic device can first determine whether the term is likely time dependent or time independent. For example, if the term relates to food, the electronic device can predict that the search is time dependent (e.g., the user is looking for restaurants that will be in the user's vicinity around a meal time). In some embodiments, the electronic device can include a library of search terms for which the device can presume time dependent searches are requested. Each term in the library can be associated with particular times, including for example fixed times, times dependent on external factors (e.g., a time that depends on the gas remaining in car), or any other timing information. In some embodiments, the user can define a search as being time dependent by providing a time stamp or timing information associated with the search.

The electronic device can predict the user's future position using any suitable approach, including for example based on historic data describing the user's typical movement (e.g., a user's commute to and from work), from a path to a destination provided by the user, or from information provided by the user defining boundaries to the user's movements (e.g., a series of way points that the user will visit). In some embodiments, the electronic device can account for stops by the user in determining an expected future position at a future time (e.g., account for a 2 hour stop at a way point for a meeting on a calendar accessed by the device).

Using an appropriate searching database (e.g., remotely accessed or locally stored), the electronic device can identify points of interest related to the search terms that are in the vicinity of the expected position of the device at the time associated with the search. For example, the electronic device can first determine the expected future location of the device at the time associated with the search term, and identify points of interest in the vicinity of the expected future location. In some embodiments, the expected future location can be a range of locations along a path (e.g., the path that the user will drive during a one hour duration). The electronic device can update or revise the search results at any suitable time, including for example upon determining that the user's expected future location has changed (e.g., the user moved faster or slower than expected along the path).

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This is directed to identifying points of interest and specific locations in the vicinity of an expected future location of a user. In particular, this is directed to identifying expected future needs or interests of a user, and providing points of interests or locations matching the identified expected future needs or interests that are near the user's expected future location.

An electronic device can include positioning circuitry for determining the current location of the user of the device. Using a database of search results accessible by the electronic device, the user can direct the device to find way points of points of interest geographically located in the vicinity of the determined current position. The user can define the points of interest using any suitable approach, including for example by providing search terms or keyword, or by selecting from a listing of keywords provided by the electronic device. The electronic device can identify the search results that satisfy suitable proximity criteria (e.g., results within a predetermined maximum distance from a particular location, such as the user's current location).

In some cases, a user may wish identify points of interest for a future time and a future location. In a first approach, the user can provide search terms for the points of interest, and define the region near which the points of interest should be found. This approach, however, may require the user to know or guess the region of the future location. In a second approach, the electronic device can automatically predict an expected future location of the user, and provide points of interest near the expected future location. The electronic device can predict future locations using any suitable approach, including for example based on one or more destinations or way points identified by the user, calendar events specifying locations, historic data describing past device movements, or any other suitable approach.

The electronic device can determine whether a user search request is associated with a future time and a future location using any suitable approach. In some embodiments, the electronic device can automatically associate particular search terms or selectable keywords with specific times. As another example, the electronic device can receive from the user a time frame to apply to the points of interest. The time frame to use for a search can be determined from an absolute time measurement (e.g., a specific time), based on an external condition (e.g., the time at which an event actually takes place, such as when the rain actually starts), based on the output of a sensor in communication with the electronic device (e.g., based on the amount of gas in a gas tank), or any other time measurement. The conditions can include, for example, temperature, weather, movement, light, or any other condition that can be measured or detected by a sensor.

In some embodiments, the electronic device can automatically determine points of interest that will likely be of interest at a future time. For example, the electronic device can monitor the driving time of a user and provide recommended pit stop for stretching at predetermined intervals. As another example, the electronic device can monitor fuel consumption and identify refueling stations for when the user's fuel will be less than a particular threshold (e.g., provide gas station recommendations 60 miles further when the user has enough gas to drive 70 miles). As still another example, the electronic device can provide point of interest recommendations based on calendar events of a user (e.g., recommend a stop at a printing center prior to a presentation).

Figure 1:
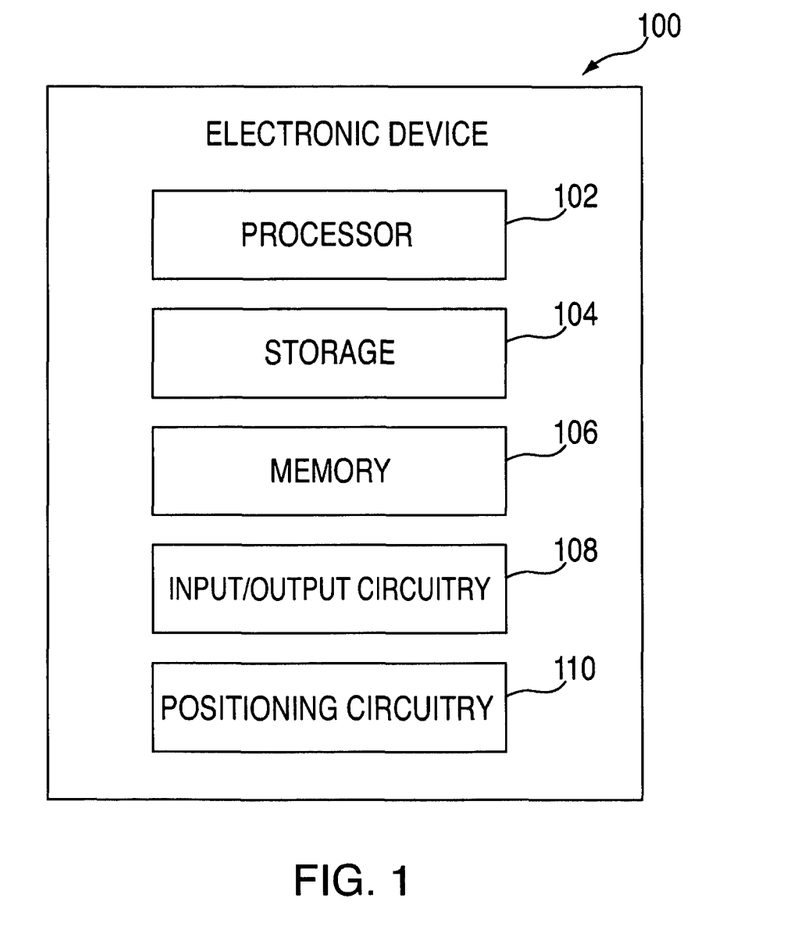
FIG. 1 is a schematic view of an illustrative electronic device for providing a mapping application in accordance with one embodiment of the invention.

FIG. 1 is a schematic view of an illustrative electronic device for providing a mapping application in accordance with one embodiment of the invention. Electronic device 100 can include any suitable type of electronic device operative to display information to a user while detecting movement of the device. For example, electronic device 100 can include a media player such as an iPod® available by Apple Inc., of Cupertino, Calif., a cellular telephone, a personal e-mail or messaging device (e.g., a Blackberry® or a Sidekick®), an iPhone® available from Apple Inc., a navigation system (e.g., portable or coupled to a vehicle), pocket-sized personal computers, personal digital assistants (PDAs), a laptop computer, a music recorder, a video recorder, a camera, radios, medical equipment, and any other portable electronic device capable of being moved by the user.

Electronic device 100 can include a processor or control circuitry 102, storage 104, memory 106 input/output circuitry 108, and communications circuitry 112, as typically found in an electronic device of the type of electronic device 100. In some embodiments, one or more of electronic device components 100 can be combined or omitted (e.g., combine storage 104 and memory 106), or electronic device 100 can include other components not combined or included in those shown in FIG. 1 (e.g., positioning circuitry), or several instances of the components shown in FIG. 1.

For the sake of simplicity, only one of each of the components is shown in FIG. 1. Electronic device 100 can include computer readable media having computer readable instructions recorded thereon for performing electronic device operations.

Positioning circuitry 110 can determine the current position of electronic device 100, and can be operative to update the current position at any suitable rate, including at relatively high rates to provide an estimation of speed and distance traveled. In some embodiments, the positioning circuitry can include a global positioning system ("GPS") receiver for accessing a GPS application function call that returns the geographic coordinates (i.e., the geographic location) of the device. The geographic coordinates can be fundamentally, alternatively, or additionally derived from any suitable trilateration or triangulation technique. For example, the device can determine its location using various measurements (e.g., signal-to-noise ratio ("SNR") or signal strength) of a network signal (e.g., a cellular telephone network signal) associated with the device. For example, a radio frequency ("RF") triangulation detector or sensor integrated with or connected to the electronic device can determine the approximate location of the device. The device's approximate location can be determined based on various measurements of the device's own network signal, such as: (1) the angle of the signal's approach to or from one or more cellular towers, (2) the amount of time for the signal to reach one or more cellular towers or the user's device, (3) the strength of the signal when it reaches one or more towers or the user's device, or any combination of the aforementioned measurements, for example. Other forms of wireless-assisted GPS (sometimes referred to herein as enhanced GPS or A-GPS) can also be used to determine the current position of electronic device 100. Instead or in addition, the positioning circuitry of the device can the location of the device based on a wireless network or access point that is in range or a wireless network or access point to which the device is currently connected. For example, because wireless networks have a finite range, a network that is in range of the device can indicate that the device is located in the approximate geographic location of the wireless network. In some embodiments, the device can automatically connect to a wireless network that is in range in order to receive the valid modes of operation for that location.

The electronic device can include a mapping application for providing a visual representation of the user's location and of the location of points of interest. For example, the electronic device can display a map representing the location of the user, on which pins or other indicators can be positioned to indicate points of interest, the user's current location, locations saved or bookmarked by the user, or any other suitable location. The map can include a representation of the user's location (e.g., drawn roads), photographic representations (e.g., satellite views or street views), combinations of these, or any other suitable representation of the user's location. In some embodiments, the mapping application may be operative to define a path that the user can follow to reach one or more destinations defined by the user. The defined path can be displayed instead of or in addition to textual directions for following the path.

Figure 2:
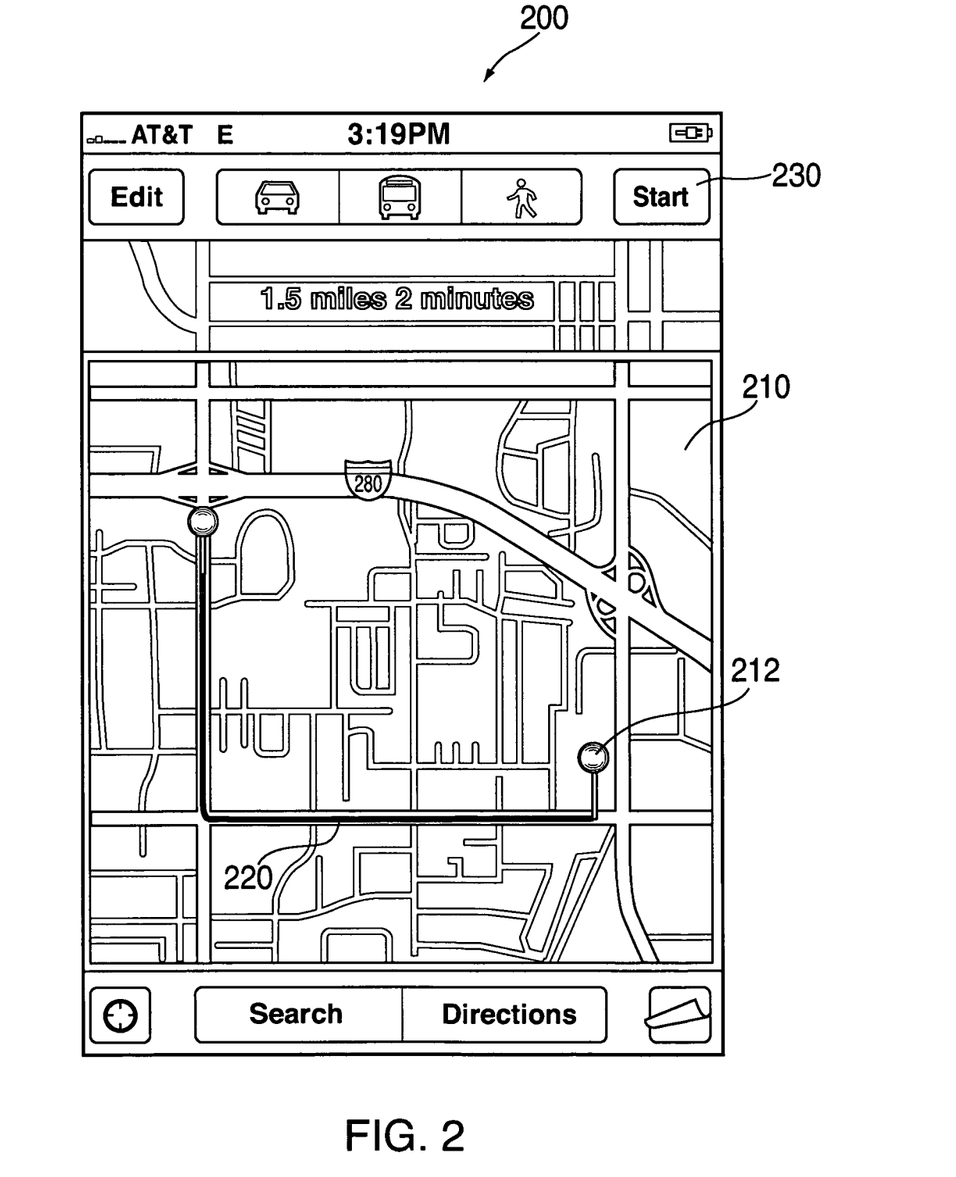
FIG. 2 is a schematic view of an illustrative display of a path for reaching a destination in accordance with one embodiment of the invention.

FIG. 2 is a schematic view of an illustrative display of a path for reaching a destination in accordance with one embodiment of the invention. Display 200 can include representation 210 of a map depicting the user's location. Representation 210 can include pin 212 identifying the current location of the device or starting location of the user, and pin 214 identifying the user's requested destination. Display 200 can in addition include path 220 directing the user from pin 212 to pin 214. Using the options of navigation bar 230, the user can direct the electronic device to step through the directions as the user drives, display alternate views (e.g., street views) of the user's path, change the path to add way points, a new destination, or a detour, or any other manipulation of the displayed mapping information.

In some embodiments, a user may wish to view the locations of points of interest that are not of interest at the time of the search, but will be of interest at a later time. For example, a user may wish to view the locations of restaurants for a meal at a later time in the day. As another example, a user may wish to see the locations of gas stations to refuel a car when it is out of gas. If the user is not moving, or is not planning on changing locations before the search becomes of interest, the user can simply perform the search at any time and review results that are close to the user's current location and future location.

If the user, however, is expected to move or knows his current location will not match a future location at which the search is of interest, the user may not be able to easily retrieve results of interest. Instead, the user may be forced to guess a future location where the results will be of interest, and manually direct the device to identify points of interest that are in the vicinity of the guessed future location. While this may be a suitable approach in some cases, the user may not always accurately guess an appropriate future position at a future time. For example, a user may have difficulty gauging when the user's car will be out of gas, and therefore of guessing where the user will be at that time.

To provide more accurate search results for time-dependent searches, the electronic device can automatically identify the future time associated with time-dependent search criteria, the expected future location of the user at the future time, and points of interest related to the search that are in the vicinity of the expected future location. For example, the electronic device can determine the future time at which the search is of interest (or the duration until the search becomes of interest), and determine the expected future location along the path based on the duration. The electronic device can then provide appropriate search results that are geographically located in the vicinity of the future location. To provide a time-dependent search result, the electronic device may first, however, be required to determine whether a search request is time-dependent or time independent.

The electronic device can determine whether a search is time dependent, or to be applied to an expected future location using any suitable approach. In some embodiments, a user may define a search as being time dependent as part of the search terms. For example, a user can toggle an option as part of the search. As another example, a user can add a tag or flag within the search terms. As still another example, a user can define a particular time or duration within the search terms (e.g., search for 'shoe stores in 1 hour'). In some embodiments, the electronic device can include a library of time dependent search terms each associated with particular time frames. For example, food related search terms can be associated with meal or snack time frames (e.g., specific hours denoting typical mean times). As another example, fuel or gas related search terms can be associated with a time frame determined from external data received from the vehicle in which the user is traveling. In some embodiments, a user may select specific time-dependent search terms from listings of time-dependent search terms provided by the electronic device.

Time-dependent searches can be associated with any suitable type of timing information. In some embodiments, the timing information can include specific times of day or ranges of time of day for which a search is of interest. The specific times of day or ranges of time can be defined using any suitable approach, including, for example, measured in absolute time (e.g., from 11 AM to 2 PM), as a duration from the time of the search (e.g., in 1 hour and 20 minutes), or a duration or time frame derived from an external condition or sensor output detected by the device. For example, the electronic device can identify a particular sensor output associated with a search, and determine a time frame to associate with the sensor output (e.g., when the user's car will be low on gas). As another example, the electronic device can receive a time frame directly from an external device or sensor, for example from a sensor operative to detect one or more of temperature, weather, movement, light, or any other condition that can be measured or detected. In some embodiments, the electronic device can determine the time frame based on known past, current or future events of the user (e.g., scheduled in a calendar application). For example, the electronic device can identify florists in the vicinity of the location of the user's dinner calendar event.

In some embodiments, the electronic device may not provide search results of a time-dependent search to a user immediately upon receiving the search request. Instead, the electronic device can store the search in memory until a condition is met. Once the condition is met, the electronic device can assume that the search is of interest and provide search results to the user. The condition can include any suitable condition that may be related to a search term, including for example location conditions, timing conditions, receiving specific information from particular components or external devices (e.g., the proximity of another device), or any other suitable condition.

Figure 3:
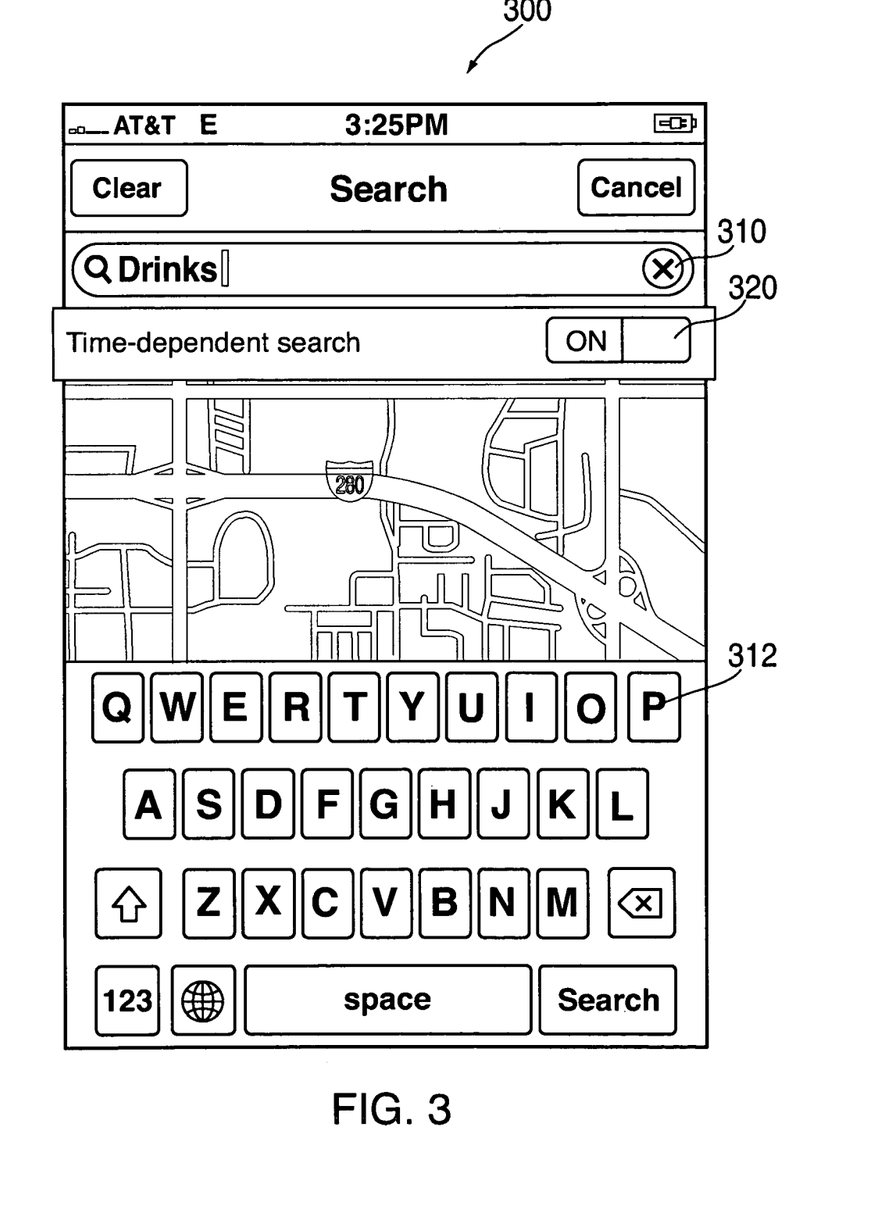
FIG. 3 is a schematic view of an illustrative display for providing a time-dependent search request in accordance with one embodiment of the invention.

FIG. 3 is a schematic view of an illustrative display for providing a time-dependent search request in accordance with one embodiment of the invention. Display 300 can include search field 310 in which the user can enter search terms for points of interest, for example using keyboard 312. To indicate that the search is time dependent, the user can specific a condition or timing information in search field 310 (e.g., "Drinks 5 PM). Alternatively, the search term can be automatically associated with a time period (e.g., 4-6 PM happy hour for "drinks"). The user can enable or display the time associations of terms using any suitable approach, including for example by toggling time dependent option 320 (or another similar option on another electronic device display).

Once the electronic device has determined the future time or time range for which to perform a time dependent search, the electronic device can determine the user's expected location at that future time or time range. To do so, the electronic device may first determine the user's expected future path using any suitable approach. In some embodiments, if the user has directed the electronic device to identify a path to a specific destination, the electronic device may know the user's expected future path. In some embodiments, the path can include one or more way points at which the user may stop for different durations. The electronic device can determine the length of the user's stops using any suitable approach, including for example based on the duration of calendar events, historical timing information associated with the locations (e.g., 10 minutes in a coffee shop), pre-defined typical or average duration associated with the type of location, or any other suitable approach. In some embodiments, the electronic device can determine different durations for each location based on the time of day.

If the user has not provided specific destinations or way points for which the device can generate a path, the electronic device can guess the user's likely path. In some embodiments, the electronic device can monitor a user's calendar, communications (e.g., email messages or telephone conversations), web browsing or searches, and other user activity to identify locations to which the user will go. In some embodiments, the electronic device can instead or in addition identify the user's expected destination based on stored historical data. For example, the electronic device can monitor a user's movements, and match the user's current location and immediately previous movement with monitored patterns of movement. In some embodiments, the electronic device can predict the user's movement based on the time of day, for example to predict the user's commute or regular sales trips.

Once the electronic device has determined the future time at which a search will be of interest, as well as the expected path of the user, the electronic device can determine the expected future location of the user at the future time. The electronic device can then provide search results related to the search terms that are in the vicinity of the expected future location.

Figure 4:
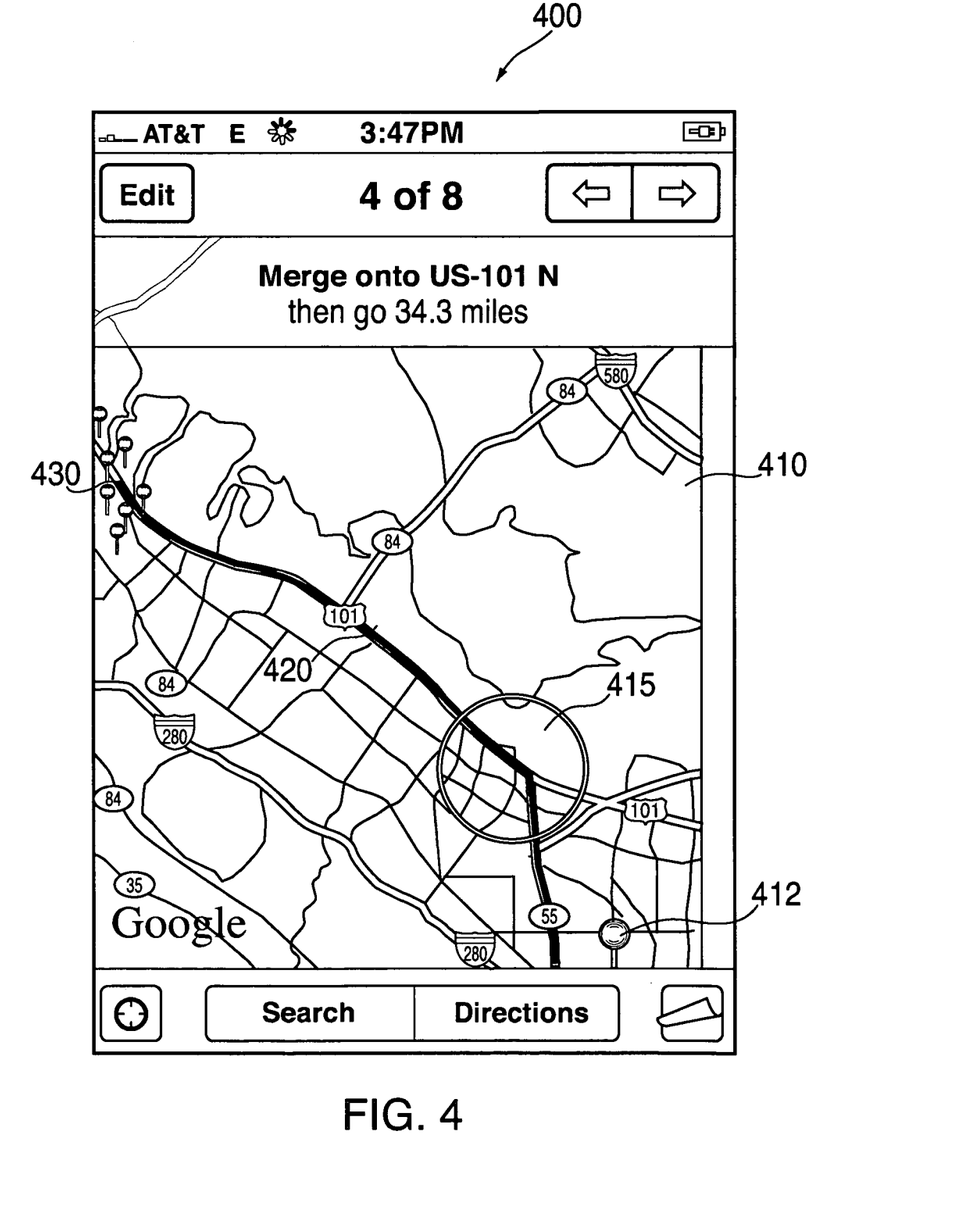
FIG. 4 is a schematic view of an illustrative display having time-dependent search results in accordance with one embodiment of the invention.

FIG. 4 is a schematic view of an illustrative display having time-dependent search results in accordance with one embodiment of the invention. Display 400 can include representation 410 of a user's path 420, defined by starting pin 412 and an end pin not on the display. The user's current location can be marked by marker 415, which can move on the display as the user's position changes. In response to receiving a time-dependent search request, the electronic device can provide result pins 430 indicating points of interest related to the search terms that are located at the user's expected future position when the user reaches the position. For example, pins 430 can represent gas stations that will be available when the gas remaining in the user's car is less than a minimum threshold. The user can select a pin 430 to see additional information regarding the pin, to add a way point via the selected pin, or to perform any other related operation.

In some embodiments, the electronic device can limit search results based on other criteria, for example related to the user's path. For example, if the user has a subsequent location or waypoint to which the user will go after the search result location, and that the user must reach by a particular time, the electronic device can hide or discount search results that would delay the user. In particular, the electronic device can account for the average amount of time spent at each of the search result locations to determine whether the user has time to stop at that particular point of interest. For example, if a user only has thirty minutes for a meal if the user is to make a meeting on time, the electronic device can only show restaurants that allow a user to eat and reach his destination on time (e.g., don't show results for more upscale sit-down restaurants). The electronic device can determine the duration associated with each point of interest using any suitable approach, including for example as duration metadata associated with the points of interest.

Figure 5:
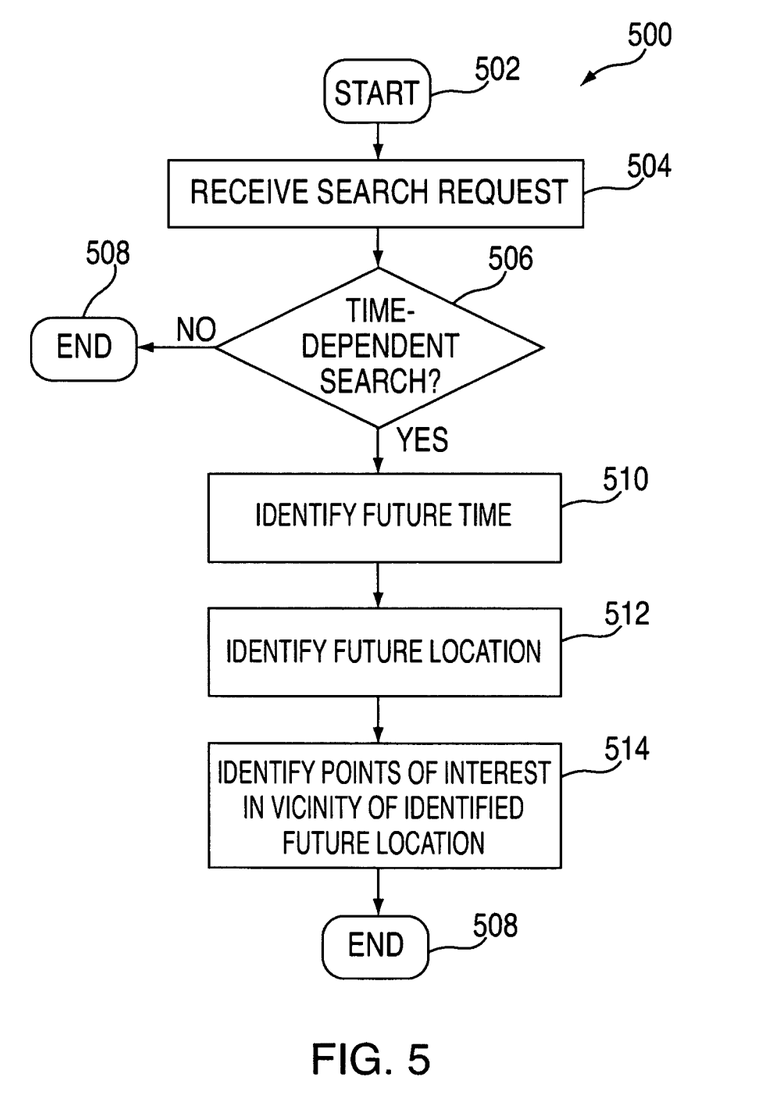
FIG. 5 is a flowchart of an illustrative process for providing time-dependent points of interest corresponding to a search in accordance with one embodiment of the invention.

FIG. 5 is a flowchart of an illustrative process for providing time-dependent points of interest corresponding to a search in accordance with one embodiment of the invention. Process 500 can begin at step 502. At step 504, the electronic device can receive a search request from the user. For example, the electronic device can receive an input from the user defining specific search terms of interest. As another example, the electronic device can detect a user's selection of a keyword or menu option for finding a specific point of interest. At step 506, the electronic device can determine whether the received search request is time-dependent. For example, the electronic device can determine whether a time-dependent flag was set with the search. As another example, the electronic device can determine whether timing information or a condition was provided as part of the search request. If the electronic device determines that the search is not time dependent, process 500 can move to step 508 and end.

If, at step 506, the electronic device instead determines that the search is time-dependent, process 500 can move to step 510. At step 510, the electronic device can identify the future time at which the search will be of interest. For example, the electronic device can identify a specific time associated with the search request or with the subject matter of the search. As another example, the electronic device can identify a time at which a condition associated with the search request will be satisfied. At step 512, the electronic device can identify the future location of the device at the identified future time. For example, the electronic device can determine the user's expected path, and the user's position along the path at the identified future time. The device can determine the user's expected path using any suitable approach, including, for example, based on destinations or way points set by the user, calendar events, monitored communications, historic data for the user, or any other suitable approach.

At step 514, the electronic device can identify points of interest associated with the search request that are in the vicinity of the identified future location. For example, the electronic device can search a database of points of interests to identify the points of interest related to the search terms, and select from those points of interest the set of points of interest positioned in the vicinity of the identified future location. As another example, the electronic device can identify the points of interest in the vicinity of the identified future location, and apply a filter to provide only the points of interest that relate to the search terms to the user. In some embodiments, the electronic device can apply external conditions to the search to ensure that a user will be able to reach a destination, way point, or calendar event on time. Process 500 can then end at step 508.

The above described embodiments of the invention are presented for purposes of illustration and not of limitation, and the present invention is limited only by the claims which follow.

What is claimed is:

1. A portable electronic device for providing a mapping application, comprising:
    a display operative to display a representation of a map; and
    control circuitry operative to:
        store a library of time-dependent search terms, wherein the library includes a stored search term and a stored time frame associated with the stored search term;
        determine a current location of a user of the portable electronic device;
        determine a destination for the user;
        determine a path between the determined current location and the determined destination;
        direct the display to plot the path on the displayed representation of the map, wherein the plotted path is plotted from a first position on the displayed representation of the map that corresponds to the current location to a second position on the displayed representation of the map that corresponds to the determined destination;
        receive a search request from the user, wherein the search request includes at least one user-entered search term that is input by the user, wherein the at least one user-entered search term corresponds to the stored search term that is associated with the stored time frame stored in the library and is used to predict a future location along the determined path between the current location and the destination;
        in response to receiving the search request from the user, determine if the search request is time-dependent;
        in response to the search request being time-dependent, identify a future time frame of interest for the received search request, wherein the future time frame of interest is identified based at least in part on the user-entered search term and the stored time frame associated with the stored search term in the library of time-dependent search terms;
        predict the future location along the determined path between the current location and the destination that the user will be at when the identified future time frame of interest is reached; and
        search for at least one point of interest that is related to the received search request and that is located in the vicinity of the predicted future location.

2. The portable electronic device of claim 1, wherein the control circuitry is further operative to:
    direct the display to display an indicator at a third position on the displayed representation of the map that corresponds to the searched at least one point of interest.

3. The portable electronic device of claim 1, wherein the control circuitry is operative to identify the time frame of interest by:
    identifying at least one term in the received user-entered search request;
    comparing the identified at least one term with a library of time-dependent search terms; and
    determining that the identified at least one term is within the library of time-dependent search terms in response to the comparing.

4. The portable electronic device of claim 3, wherein:
    the library of time-dependent search terms comprises a listing of time-dependent search terms;
    the listing of time-dependent search terms comprises at least one time-dependent search term that is related to at least one meal time; and
    the identified at least one term is associated with the at least one meal time.

5. The portable electronic device of claim 1, wherein the control circuitry is operative to:
    predict the future location based on the current location.

6. The portable electronic device of claim 1, wherein the control circuitry is operative to determine the destination by:
    receiving from the user an input that indicates the destination.

7. The portable electronic device of claim 1, wherein the control circuitry is operative to determine the destination by predicting the destination based on at least one of:
    prior user movement;
    locations of calendar events; and
    locations retrieved from communications performed using the portable electronic device.

8. The portable electronic device of claim 1, wherein the predicted future location is one of a range of locations along a path between the current location and the determined destination.

9. The portable electronic device of claim 1, further comprising control circuitry operative to update the predicted future location according to a change in a travel condition while traveling along the determined path.

10. The portable electronic device of claim 9, wherein the travel condition comprises at least one of temperature, weather, a low fuel level in a vehicle, a rate of movement of the vehicle, and light.

11. The portable electronic device of claim 1, wherein the future time frame of interest is a time frame between a current time and a destination arrival time.

12. The portable electronic device of claim 1, wherein the at least one user-entered search term comprises a word entered by the user.

13. The portable electronic device of claim 1, wherein the future location along the determined path is identified by a pin and selection of the pin provides information regarding the future location identified by the pin.

14. The portable electronic device according to claim 1, wherein the future time frame of interest is identified according to one of a time stamp and time information associated with the at least one user-entered search term.

15. The portable electronic device according to claim 1, wherein the user-entered search term relates to one of a printing center and a shopping venue.

16. A method for identifying points of interest, comprising:
storing a library of time-dependent search terms, wherein the library includes a stored search term and a stored time frame associated with the stored search term;
receiving with an electronic device at least one user-entered search term that is input by a user, wherein the at least one user-entered search term corresponds to the stored search term that is associated with the stored time frame stored in the library and is used for identifying at least one point of interest along a path between the current location and the destination;
determining with the electronic device that the received at least one user-entered search term is associated with a future time frame other than a current time frame, wherein the future time frame is determined based at least in part on the user-entered search term and a stored time frame in the library of time-dependent search terms;
monitoring with the electronic device at least one movement of the user;
identifying with the electronic device the path for the user;
predicting with the electronic device a future location along the identified path between the current location and the destination that the user will be when the future time frame is reached based on the monitored at least one movement; and
in response to receiving the at least one user-entered search term from the user, determining if the search request is time-dependent, in response to the search request being time-dependent identifying with the electronic device the at least one point of interest based on the predicted future location and the stored time frame associated with the stored search term in the library of time-dependent search terms.

17. The method of claim 16, wherein the determining that the received at least one user-entered search term is associated with the future time frame comprises:
identifying a condition that is associated with the received at least one user-entered search term; and
deciding the future time frame based on the identified condition.

18. The method of claim 17, wherein:
the identified condition is satisfied when information is received by the electronic device from an environment of the user; and
the deciding the future time frame comprises deciding when the information is expected to be received by the electronic device.

19. The method of claim 18, wherein the identified condition comprises at least one of:
temperature;
weather;
a low fuel level in a vehicle;
movement; and
light.

20. The method of claim 16, wherein the identifying is based at least in part on the received at least one user-entered search term.

21. The method of claim 16, wherein the predicting the future location based on the monitored at least one movement comprises determining an expected destination of the user by comparing the monitored at least one movement to previously monitored patterns of movement.

22. The method of claim 16, wherein the identified at least one point of interest is located ahead of a current location of the user in a direction of the monitored at least one movement.

23. A non-transitory computer readable media for identifying points of interest, comprising computer-readable instructions for:
storing a library of time-dependent search terms, wherein the library includes a stored search term and a stored time frame associated with the stored search term;
receiving with an electronic device at least one user-entered search term that is input by a user, wherein the at least one user-entered search term corresponds to the stored search term that is associated with the stored time frame stored in the library and is used for identifying at least one point of interest along a path between a current location and a destination;
determining with the electronic device that the received at least one user-entered search term is associated with a future time frame other than a current time frame, wherein the future time frame is determined based at least in part on the user-entered search and the stored time frame associated with the stored search term in the library of time-dependent search terms;
monitoring with the electronic device at least one movement of a user of the electronic device;
identifying with the electronic device a path for the user;
predicting with the electronic device a future location along the identified path between the current location and the destination that the user will be when the future time frame is reached based on the monitored at least one movement; and
in response to receiving the at least one user-entered search term from the user, determining if the search request is time-dependent, in response to the search request being time-dependent identifying the at least one point of interest based on predicted future location.

24. The non-transitory computer readable media of claim 23, wherein the determining that the received at least one search term is associated with the first time frame comprises:
comparing with the electronic device the received at least one search term with a library of search terms, wherein each search term in the library of search terms is associated with a particular time frame; and
determining that the received at least one search term is related to a first search term in the library of search terms, wherein the future time frame comprises the particular time frame that is associated with the related first search.

25. The non-transitory computer readable media of claim 23, wherein the identifying is based at least in part on the received at least one user-entered search term.

26. The non-transitory computer readable media of claim 23, wherein the predicting the future location based on the monitored at least one movement comprises determining an expected destination of the user by comparing the monitored at least one movement to previously monitored patterns of movement.

27. The non-transitory computer readable media of claim 23, wherein the identified at least one point of interest is located ahead of a current location of the user in a direction of the monitored at least one movement.

\* \* \* \* \*